US006615264B1

(12) United States Patent
Stoltz et al.

(10) Patent No.: US 6,615,264 B1
(45) Date of Patent: Sep. 2, 2003

(54) METHOD AND APPARATUS FOR REMOTELY ADMINISTERED AUTHENTICATION AND ACCESS CONTROL

(75) Inventors: Benjamin H. Stoltz, Mountain View, CA (US); James G. Hanko, Redwood City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/289,788

(22) Filed: Apr. 9, 1999

(51) Int. Cl.[7] ............................................. G06F 15/16
(52) U.S. Cl. ...................... 709/227; 709/225; 709/227; 709/228; 709/229; 709/230; 713/201; 713/202
(58) Field of Search .............. 380/25, 255; 395/287.01; 713/200, 201, 225, 168, 155, 202; 709/227, 228, 229, 230, 231, 250; 705/35; 369/84

(56) References Cited

U.S. PATENT DOCUMENTS

| | | | | |
|---|---|---|---|---|
| 5,442,749 | A | | 8/1995 | Northcutt et al. |
| 5,761,309 | A | * | 6/1998 | Ohashi et al. ................. 380/25 |
| 5,774,551 | A | * | 6/1998 | Wu et al. ..................... 713/155 |
| 5,841,970 | A | * | 11/1998 | Tabuki ................... 395/287.01 |
| 5,845,070 | A | * | 12/1998 | Ikudome ...................... 713/201 |
| 5,944,824 | A | * | 8/1999 | He ............................... 713/201 |
| 6,006,328 | A | * | 12/1999 | Drake .......................... 713/200 |
| 6,023,684 | A | * | 2/2000 | Pearson ......................... 705/35 |
| 6,073,242 | A | * | 6/2000 | Hardy et al. ................. 713/201 |
| 6,173,400 | B1 | * | 1/2001 | Perlman et al. ............. 380/255 |
| 6,219,790 | B1 | * | 4/2001 | Lloyd et al. ................. 713/201 |
| 6,223,289 | B1 | * | 4/2001 | Wall et al. ................... 709/227 |
| 6,226,744 | B1 | * | 5/2001 | Murphy et al. .............. 713/200 |
| 6,226,751 | B1 | * | 5/2001 | Arrow et al. ................ 713/201 |
| 6,226,752 | B1 | * | 5/2001 | Gupta et al. ................. 713/201 |
| 6,233,565 | B1 | * | 5/2001 | Lewis et al. ................... 705/35 |
| 6,275,944 | B1 | * | 8/2001 | Kao et al. .................... 713/202 |
| 6,289,462 | B1 | * | 9/2001 | McNabb et al. ............. 713/201 |
| 6,317,830 | B1 | * | 11/2001 | Stolz ........................... 713/168 |
| 6,385,596 | B1 | * | 5/2002 | Wiser et al. ................... 369/84 |
| 6,470,397 | B1 | * | 10/2002 | Shah et al. .................. 709/250 |

OTHER PUBLICATIONS

Neuman, B. Clifford and Ts'o, Theodore, "Kerberos: An Authentication Service for Computer Networks," IEEE Communications Magazine, Sep. 1994, pp. 33–38, vol. 32, No. 9.

Samar, Vipin and Lai, Charlie, "Making Login Services Independent of Authentication Technologies," 3rd ACM Conference on Computer and Communications Security, Mar. 1996.

* cited by examiner

Primary Examiner—Ario Etienne
Assistant Examiner—Thu Ha Nguyen
(74) Attorney, Agent, or Firm—O'Melveny & Myers LLP

(57) ABSTRACT

Authentication and session management can be used with a system architecture that partitions functionality between a human interface device (HID) and a computational service provider such as a server. An authentication manager executing on a server interacts with the HID to validate the user when the user connects to the system via the HID. The authentication manager interacts with authentication modules. Each authentication module may be configured to authenticate a user based on a different authentication mechanism (e.g., using a smart card, using a login and password, using biometric data, etc.) and may be utilized in connection with one or more sessions. The authentication manager and authentication modules are also responsible for controlling access to services/sessions and may remove/revoke or augment such access. A session manager executing on a server manages services running on computers providing computational services (e.g., programs) on behalf of the user. The session manager notifies each service in a session that the user is attached to the system using a given desktop machine. A service can direct display output to the HID while the user is attached to the system. When a user detaches from the system, each of the service's executing for the user is notified via the authentication manager and the session manager. Upon notification that the user is detached from the system, a service continues to execute while stopping its display to the desktop machine.

21 Claims, 11 Drawing Sheets

METHOD AND APPARATUS FOR REMOTELY ADMINISTERED AUTHENTICATION AND ACCESS CONTROL

BACKGROUND OF THE INVENTION

1. Field of the Invention

This invention relates computer systems and, more specifically, to user authentication and the location management of user sessions.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

The paradigms by which computer systems have been configured have changed over time. In earlier times, a computer consisted of a so called "mainframe" computer that was accessed by a plurality of "dumb terminals". The mainframe was a central station that provided computational power and data storage. A dumb terminal was a display device for data provided by the mainframe, and also provided a means to communicate some data to the mainframe. Other system paradigms followed, including the desktop computer, client/server architecture, and recently, the so-called network computer. Using a dumb terminal paradigm, a user may switch from one terminal to another terminal. Each time a user switches a terminal, the user must be authenticated to work at new terminal. Various authentication mechanisms may be utilized such as a user name and password, biometric information (e.g., fingerprint or retinal scan), a smart card, etc. Different types of sessions need to be supported at different terminals by varying users. The prior art does not provide a satisfactory means to authenticate a user and control access to available network services/sessions and terminals based on the authentication.

A desktop computer is a self contained computing system where all applications and data are resident on the desktop computer system itself. Such systems were implemented in personal computers and have spurred the use of computers in homes and offices. A disadvantage of desktop computers is the short lifetime of the hardware used in the system. Desktop computers are microprocessor driven, and as faster and more powerful microprocessors become available, upgrades of existing desktop systems, or purchase of new desktop systems, is required. In many offices, there are personal desktop computers distributed throughout, sometimes numbering in the thousands and tens of thousands. A disadvantage of such large systems is the lack of compatibility of applications and data on individual systems. Some users may have more recent versions of software applications that are not backwards compatible with older versions of the software. The solution to this problem is to maintain consistent software on all systems. However, the cost to upgrade each system and to provide licensed copies of software and software upgrades can be substantial.

Client server systems are systems where central stores of data and/or applications are accessed through a network by personal computer clients. This provides some administrative efficiency in maintaining the shared data. However, the clients still have local applications and data that can present the same kinds of problems faced in the desktop systems already described.

Recently, the rise of the internet has resulted in the proposed use of so-called "network computers". A network computer is a stripped down version of a personal computer with less storage space, less memory, and often less computational power. The idea is that network computers will access data through the internet, and only those applications that are needed for a particular task will be provided to the network computer. When the applications are no longer being used, they are not stored on the network computer. There has been some criticism of such systems as lacking the power of a full desktop system, yet not being inexpensive enough to justify the reduced capability. And even though the network computer is a subset of a desktop computer, the network computer may still require upgrades of hardware and software to maintain adequate performance levels.

An example of a dynamic host configuration protocol is provided in RFC 2131. RFCs 1321 and 2104 contain examples of MD5, or message digesting. A point to point challenge host authentication protocol is contained in RFC 1994.

Prior art mechanisms provide various means to authenticate a user. One prior art mechanism is referred to as kerberos. The kerberos system provides authentication over a network. To authenticate a user, registration in a kerberos database for each user is required. Once registered, a ticket is issued that contains an encrypted protocol message that provides authentication. Kerberos utilizes the ticket transparently to the user for network utilities such as NFS, rlogin, and rcp. A ticket may have special privileges (e.g., for an administrator) and may expire after a specified period of time (e.g., 3 minutes). However, kerberos does not remove a user's session at the end of the time period, it will merely not allow a user to log back on once a user has disconnected. The ticket enables a user to present passwords to remote hosts without having to bother with remote files and login procedures. However, kerberos does not provide for access control features.

Another prior art mechanism is referred to as PAM (pluggable authentication modules). PAM includes an interface library and multiple authentication service modules. The interface library is the layer implementing the application programming interface (API). The authentication service modules are a set of dynamically loadable objects invoked by the PAM API to provide a particular type of user authentication (e.g., smart card, user name and password, biometric data, etc.). PAM gives system administrators the flexibility of choosing any authentication service available on the system to perform authentication. New authentication modules can be plugged in and made available without modifying applications. PAM modules assume that the user being authenticated knows its identity and a password associated with that identity. Further, the PAM system is not concerned with and assumes that a communication port (that will be used to communicate with a user and conduct transmissions) is already established (e.g., the port is pre-configured for remote terminals and local consoles). Additionally, PAM relies on statically configured users and display devices (e.g., a server is preconfigured for each user and terminal). Once the number of users/terminals is known, a server is preconfigured for each server/user statically. The configurations for a user/terminal are not performed dynamically when requested. Further, once authenticated, PAM modules disappear and are no longer utilized.

SUMMARY OF THE INVENTION

Authentication and session management can be used with a system architecture that partitions functionality between a human interface device (HID) and a computational service provider such as a server. An authentication manager executing on a server interacts with the HID to validate the user when the user connects to the system via the HID. The authentication manager interacts with authentication modules. Each authentication module may be configured to authenticate a user based on a different authentication mechanism (e.g., using a smart card, using a login and password, using biometric data, etc.) and may be utilized in connection with one or more sessions. The authentication manager and authentication modules are also responsible for controlling access to services/sessions and may remove/revoke or augment such access. A session manager executing on a server manages services running on computers providing computational services (e.g., programs) on behalf of the user. The session manager notifies each service in a session that the user is attached to the system using a given desktop machine. A service can direct display output to the HID while the user is attached to the system. When a user detaches from the system, each of the service's executing for the user is notified via the authentication manager and the session manager. Upon notification that the user is detached from the system, a service continues to execute while stopping its display to the desktop machine.

DETAILED DESCRIPTION OF THE INVENTION

A method and apparatus for remotely administered authentication and access control services is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Overview

Methods and apparatus are described according to one or more embodiments of the invention for authenticating a system user and controlling access to services/sessions for a system user. In one embodiment of the invention, authenticating and access control are performed within a system architecture that partitions the computing functionality between a user's HID and a computational service provider such as a server.

Figure 1:
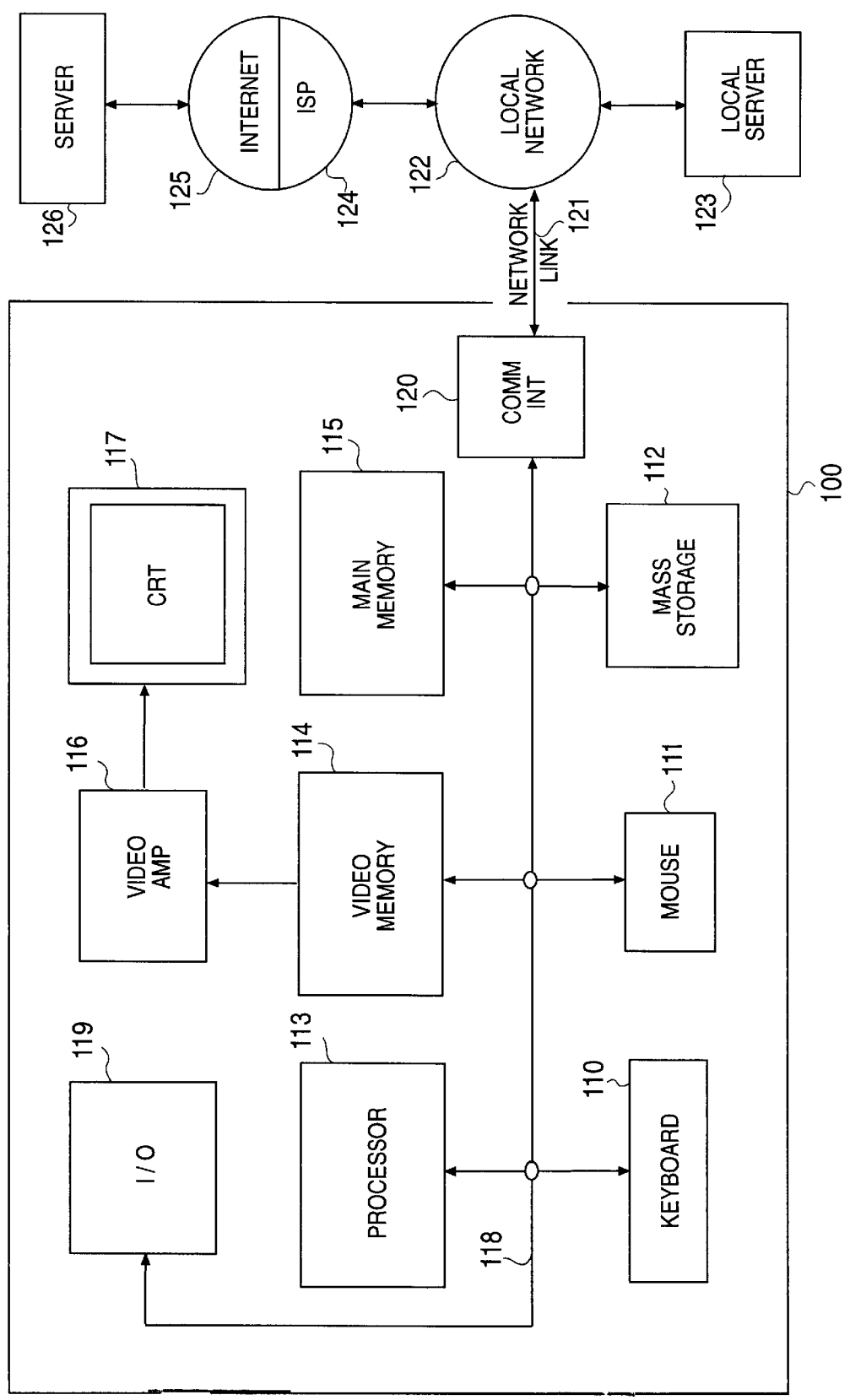
FIG. 1 is an example of a system architecture used in one or more embodiments of the invention.
Figure 7:
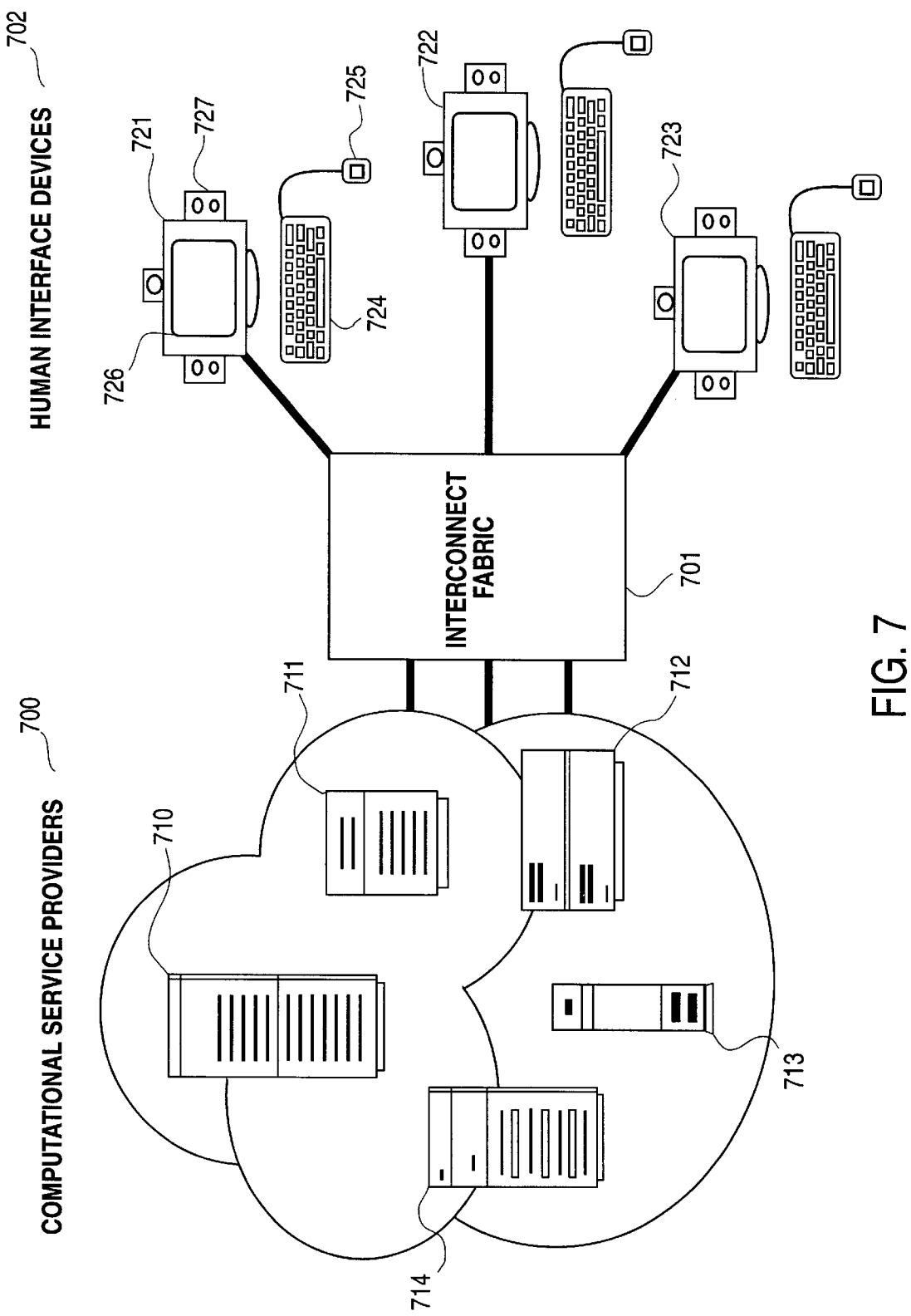
FIGS. 7 and 8 provide examples of system architectures used in one or more embodiments of the invention.
Figure 8:
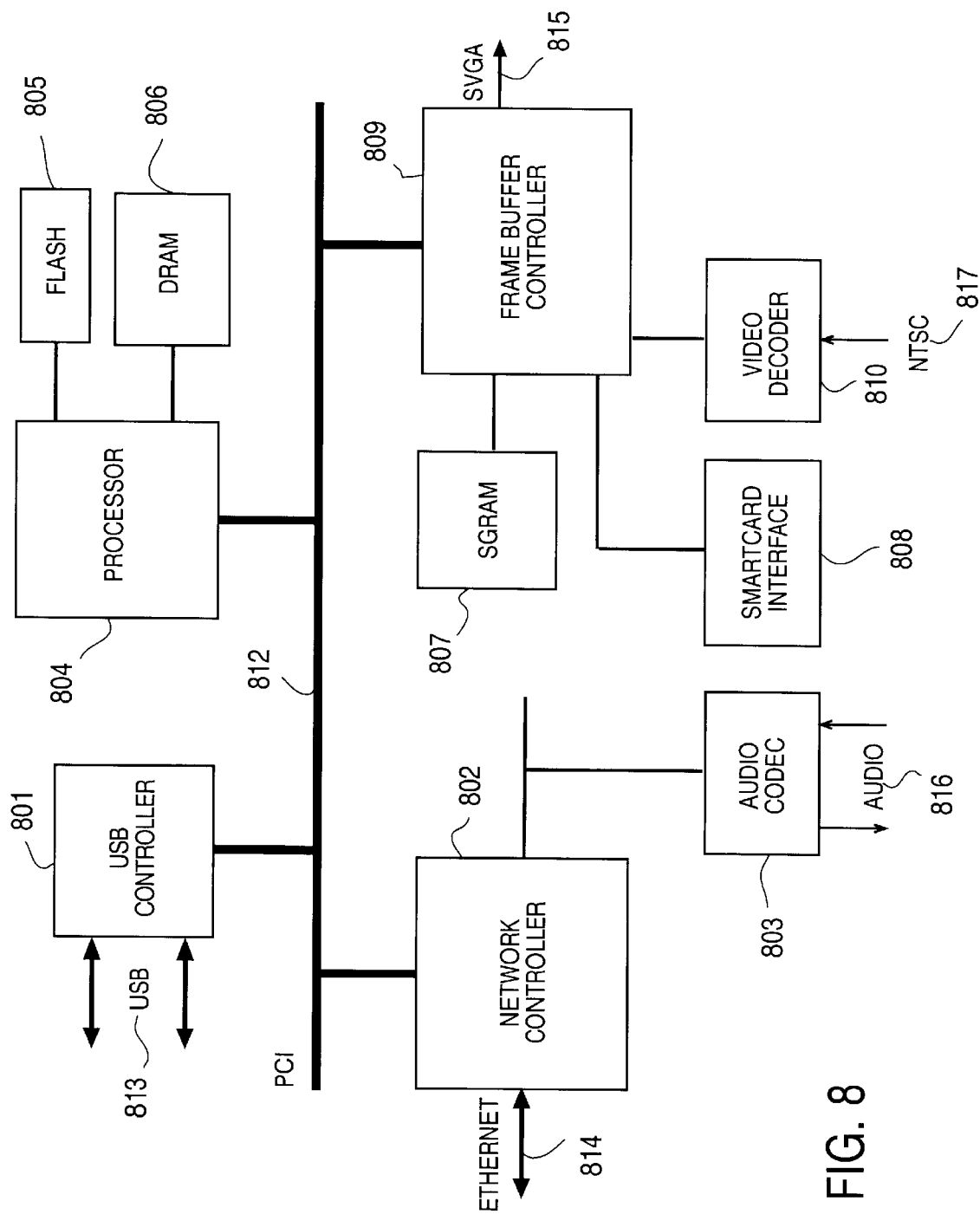

FIGS. 1, 7, and 8 provide examples of system architectures used in one or more embodiments of the invention. The present invention can be implemented in standard desktop computer systems such as described in FIG. 1, or in any other computer systems, including client-server systems, network computers, or the human interface device system of FIGS. 7 and 8.

Embodiment of Computer Execution Environment (Hardware)

An embodiment of the invention can be implemented as computer software in the form of computer readable code executed on a general purpose computer such as computer 100 illustrated in FIG. 1, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 110 and mouse 111 are coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, are coupled to system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for selecting attachments described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Human Interface Device Computer System

The invention also has application to a computer systems where the data to be displayed is provided through a network. The network can be a local area network, a wide area network, the internet, world wide web, or any other suitable network configuration. One embodiment of the invention is used in computer system configuration referred to herein as a human interface device computer system.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 7. Referring to FIG. 7, the system consists of computational service providers 700 communicating data through interconnect fabric 701 to HIDs 702.

Computational Service Providers—In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 7, the services are found on computers 710, 711, 712, 713, and 714.

Examples of services include Java™ program execution service, X11/Unix services, archived video services, Windows NT service, and others. A service herein is a process that provides output data and responds to user requests and input.

Interconnection Fabric—In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

HIDs—The HID is the means by which users access the computational services provided by the servers or services, and as such the HID may also be referred to as a client or user workstation or terminal. FIG. 7 illustrates HIDs 721, 722, and 723. A HID consists of a display 726, a keyboard 724, mouse 725, and audio speakers 727. The HID includes the electronics need to interface these devices to the interconnection fabric and to transmit to and receive data from the services.

A block diagram of the HID is illustrated in FIG. 8. The components of the HID are coupled internally to a PCI bus 812. A network control block 802 communicates to the interconnect fabric, such as an ethernet, through line 814. An audio codec 803 receives audio data on interface 816 and is coupled to block 802. USB data communication is provided on lines 813 to USB controller 801.

An embedded processor 804 may be, for example, a Sparc2ep 804 with coupled flash memory 805 and DRAM 806. The USB controller 801, network controller 802 and embedded processor 804 are all coupled to the PCI bus 812. Also coupled to the PCI 812 is the video controller 809. The video controller 809 may be for example, and ATI Rage128 frame buffer controller (or any other suitable controller) that provides SVGA output on line 815. NTSC or PAL data is provided into the video controller through video decoder 810. A smart card interface 808 may also be coupled to the video controller 809.

Alternatively, the HID can be implemented using a single chip solution including the necessary processing capability.

This architecture or system is described in greater detail in U.S. patent application Ser. No. 09/063,335, assigned to the present assignee, filed Apr. 20, 1998, entitled "Method and Apparatus for Providing a Virtual Desktop System Architecture" which is hereby fully incorporated by reference.

The computer systems described above are for purposes of example only. An embodiment of the invention may be implemented in any type of computer system or programming or processing environment.

In one or more embodiments of the invention, authentication and session management components are configured to authenticate users and control access to services/sessions. A session is a persistent representation of a related set of one or more services executing on behalf of a user. Embodiments of the invention authenticate a user and relocate a user's session based on the current location of the user without requiring a service within a session to be configured to perform user validation and relocation. One or more embodiments of the invention authenticate the user once for all of the user's services. Other embodiments of the invention may require reauthentication or a new authentication depending on the service utilized. Using embodiments of the invention, services are directed to the HID (or other terminal device) that a user is currently using. It is not necessary for the user to login to each service and establish a new connection for a specific HID. Using embodiments of the invention, the use of a particular service may also be terminated if desired. For example, after a designated time period, a user's authentication may no longer be valid and such invalidity may act to terminate a session. Alternatively, a user may be requested to reauthenticate themselves every so often to ensure only authorized users are permitted access. Should a reauthentication attempt fail, a session may be terminated immediately.

According to embodiments of the invention, authentication is a one-way authentication which improves the manageability and scalability of authentication. There is no need to exchange keys and avoids the need to perform key lookups in a central database.

Figure 2:
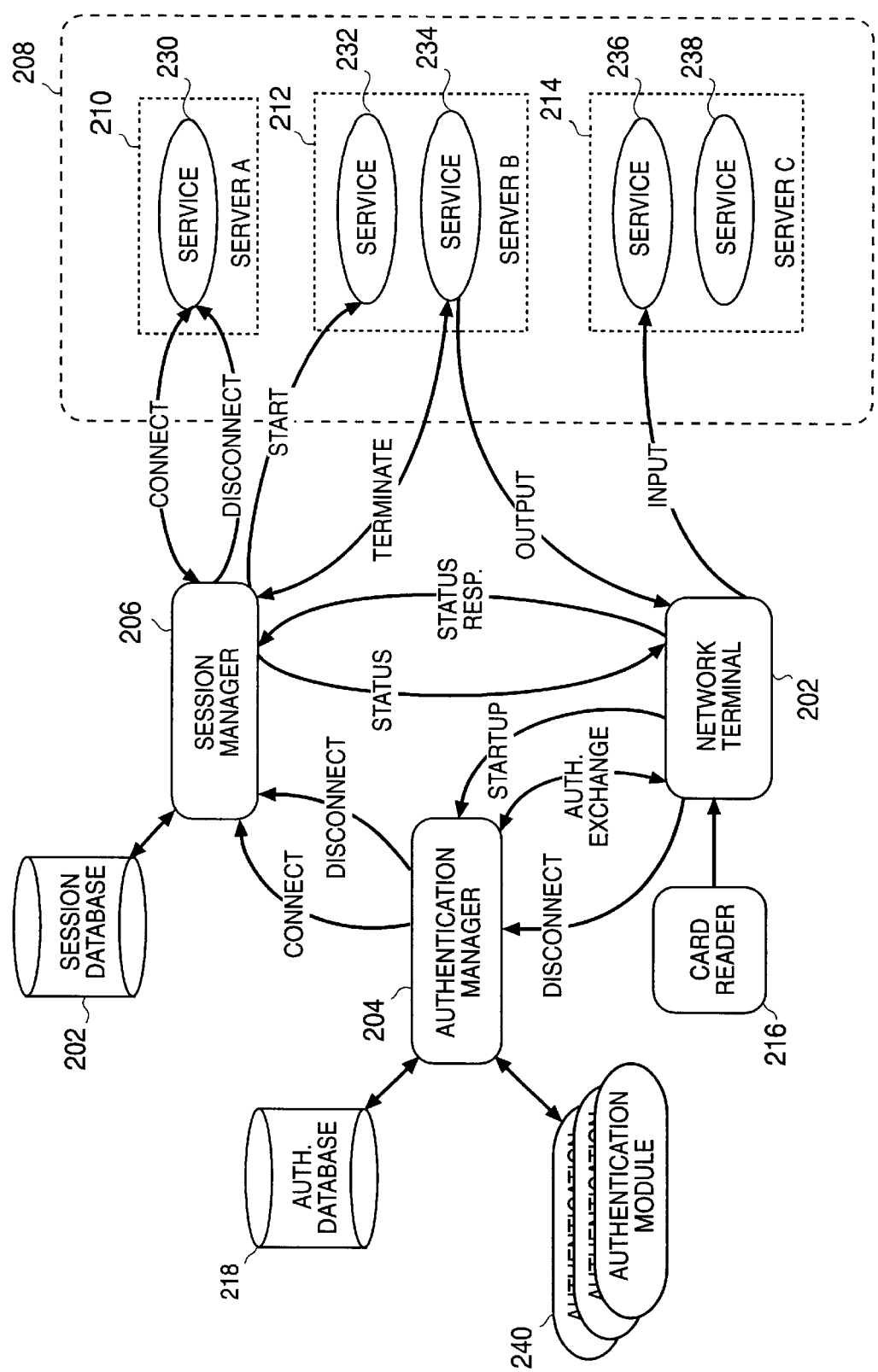
FIG. 2 illustrates authentication and session management components and their interactions according to an embodiment of the invention.

FIG. 2 illustrates authentication and session management components and their interactions according to an embodiment of the invention. Network terminal 202 is a human interface device (HID) (e.g., HIDs 821, 822 and 823). An HID has, as examples of its functions, the task of displaying output of services to a user and obtaining input to services from the user. Network terminal 202 has the ability to respond to a command (e.g., display command) received from, for example, a software program (e.g., services 230–238, authentication manager 204 and session manager 206) executing on a computational service provider (e.g., computers 710, 711, 712, 713, and 714). The input received from a user is forwarded to, for example, a service that is fulfilling a user request.

More than one server can execute the services that comprise a session. For example, in session 208, service 230 is executing on server 210, services 232 and 234 are executing on server 212 and services 236 and 238 are executing on server 214.

A user may access a system (e.g., a server, a session, a service and a network terminal) by initiating a login or other authentication mechanism (e.g., smart card, biometric data, etc.). A separate authentication module 240 may be utilized for each authentication mechanism. During login, the user is validated by an authentication module 240. The authentication modules 240 communicate with authentication manager 240 where a user may be associated with a particular session. Various techniques can be used to allow the user to initiate a login. For example, the user can initiate a login by pressing a key on network terminal 202. Further, a terminal 202 may have screen display icons that allow a user to determine the progress of the authentication process.

In one embodiment of the invention, a user accesses the system by inserting a smart card in a card reader (e.g., card reader 216) attached to network terminal 202. A smart card is a card that is capable of storing information such as in a magnetic strip or memory of the smart card. The smart card can store user information such as a user's identification (i.e., user ID such as a 64-bit number) and a secret code (e.g., a 128-bit random number) that is transmitted to network terminal 202. The secret code is used during authentication by a smart card authentication module, for example.

Network terminal 202 is aware of (or can obtain) its interconnection network address and the address of authentication manager 204. When a user initiates the login, network terminal 202 initiates communication with authentication manager 204 to begin authentication. Authentication manager 204 is a program active (e.g., executing) on a computational service provider connected to network terminal 202 via an interconnection network such as a local area network (LAN), for example. It should be apparent, however, that network terminal 202 can be connected to authentication manager 204 using other interconnection network technologies such as a fiber channel loop or point-to-point cables. Network terminal 202 sends a startup request to authentication manager 204 that includes a unique identifier that may correspond to a user. Such an identifier may originate from a token (a particular message or bit pattern that signifies permission to transmit information) or a pseudo token. For example, tokens may be encoded into smart cards and when a smart card is inserted in a card reader at a terminal, the token is transmitted from the terminal 202. Alternatively, a token may be created by a fingerprint reader or other external device. If a smart card is not inserted, or a token is not presented at terminal 202, terminal 202 may construct a "pseudo token" and transmit the pseudo token to authentication manager 204. A pseudo token may be identified by the type associated with it (e.g., "pseudo") and a network interface address such as an ethernet address or a media access controller (MAC) address.

To initiate a connection, a network terminal 202 may be booted up. Once booted, terminal 202 may utilize a dynamic host configuration protocol (DHCP) to obtain application parameters such as the internet protocol address. Terminal 202 then establishes a connection with authentication manager 204 (e.g., using TCP). To establish a connection, terminal 202 may send a message or present a token to the authentication manager 204. Authentication manager 204 then determines whether it wants to take responsibility for this particular terminal/user. In one or more embodiments, authentication manager 204 presents the message (with the token) to one or more authentication modules 240.

Authentication modules 240 each have the option of accepting or declining responsibility for a particular connection. Authentication modules 240 may base their decision on other available system resources or settings (e.g., from services 230–238, external databases, etc.). In one or more embodiments, an authentication module 240 can be configured to accept all users all of the time, to only accept connections with smart cards, or to only accept users with pseudo tokens, for example.

In one or more embodiments, authentication modules 240 may be cascaded and a message may pass from one module to another module until responsibility is accepted. Thus, when an authentication module 240 declines responsibility for a particular connection, the message may be passed onto another authentication module 240. Modules 240 may be ordered such that the first time responsibility is claimed, all "lower" modules do not apply. Alternatively, modules 240 may be stacked and multiple modules may be utilized or required in one connection. If all modules decline responsibility, access may be denied. If a module 240 decides to accept responsibility, various generic services may be provided to modules 240 by authentication manager 204. For example, authentication manager 204 may provide authentication module 240 with a start session service (a procedure that ensures a session is started (see further description below)). Additionally, the module 240 has the option of further communicating with terminal 202. For example, module 240 may challenge the user using a challenge-response routine or request a secondary password.

Authentication modules may be structured for any mechanism that verifies the identity of the user to the system. A key or password known only to the user, or biometrics information can be used to authenticate the user. For example, one authentication module may be utilized to authenticate a user based on a smart card while another authentication module may be utilized to authenticate a user based on a key or password or biometrics information.

In one or more embodiments of the invention, authentication is performed by verifying a personal identification number (PIN) entered by the user at network terminal 202 by an authentication module 240. An authentication module 240 sends a command (i.e., a challenge command) to initiate entry of the user's PIN at network terminal 202. The user entry is packaged by network terminal 202 and transmitted to authentication module 240 (i.e., a challenge response).

Authentication module 240 verifies the challenge response with user information retained in authentication database 218, for example, information supplied by the user and information that is generated during authentication. When the user is authenticated, the user eventually be given access to a session (e.g., session 208). Through the user authentication process, authentication modules are able to establish a communication port through which future transmissions will be conducted with terminal 202. Thus, authentication modules 240 are concerned with both the wiring to a terminal to establish a port and authenticating a user utilizing that port.

In one or more embodiments, two authentication modules may be utilized. In such an embodiment, when a token or smart card is inserted at terminal 202, terminal 202 sends a message to authentication manager 204. Authentication manager 204 presents the message to the first authentication module 240. The first authentication module 240 looks up the token in a database to determine if the token is registered with the system. If not (i.e., the first authentication module does not want to accept responsibility for the token/message), the first authentication module passes the token/message onto a second authentication module. The second authentication module may be configured to accept all tokens/messages. Once the token is received, the second authentication module may initiate a registration session and inform the session manager to connect the session to the terminal issuing the request. The registration application presents a form interface to the user where information regarding the user may be obtained (e.g., a username and password or biometric data). Once the information is received, the information about the user and the token may be stored in a database. Consequently, a token may be bound to a particular user. The registration application may then terminate. Thus, the next time a token is presented to the first authentication module, the token is present and registered with the system so that the first authentication module may take responsibility for the token/message. Using this embodiment, users update a registration database instead of relying on an administrator to manually update information each time a new user is added to a system. Thus, authentication manager 204 is responsible for passing messages onto authentication modules 240, for denying or allowing access to a session, and if allowing access, determining what type of session to present to terminal 202.

In one or more embodiments of the invention, once authenticated, the authentication modules may remain active and ensure that the authentication maintains a proper state. For example, authentication may be time sensitive (e.g., from 9 A.M. to 5 P.M.) and once the specified time has expired, an authentication module 240 may revoke the authentication and a session may be terminated. Alternatively, an authentication module 240 may require reauthentication from a user at random times. For example, if a user is at a terminal 202 that requires payment every 10 minutes, an authentication module 240 may debit a cash card every 10 minutes until the cash card is empty at which point a session may be removed/revoked from display on terminal 202. In another use, a teacher in a classroom may validate student's terminals for one hour to view a preconfigured set of internet sites. After an hour, authentication modules 240 may remove/revoke each student's display of the session.

If the expected result is received from the user (i.e., authentication module 240 has authenticated a user), authentication module 240 informs authentication manager 204 of the authentication. Authentication manager 204 or authentication module 240 may then use a start session service to ensure a session is currently running. Once a session is established, terminal 202 is connected to the session. To establish a connection to a session, authentication manager 204 notifies session manager 206 (via a connect message) that the user has logged into the system on network terminal 202. Session information contained in authentication database 218 may be used to identify the server, port and session identifier (ID) for session manager 206. Session manager 206 is a program that is active on a computational service provider and is connected to authentication manager 204 and network terminal 202 via an interconnection network, for example. Thus, as described, authentication manager 204 sends a message to session manager 206 using session manager 206's server and port information contained in authentication database 218, for example. As a result, authentication manager 204 dynamically configures a network terminal for a particular service (e.g., services 230–238). In one or more embodiments of the invention, authentication modules 240 may annotate a session based on the authentication and a behavior can be modified based on the annotation. For example, a module 240 may annotate a session such that a user is authenticated based on a fingerprint and subsequent authentication modules can use that annotation.

In response to the connect message from authentication manager 204, session manager 206 notifies the services in the user's current session (i.e., the services in session 208) that the user is attached to network terminal 202. That is, session manager 206 sends a connect message to services 230–238 to direct output to network terminal 202. Session manager 206 ensures that services that are considered to be required services of the session are executing. If not, session manager 206 causes them to be initiated. The user can interact with services 230–238 within a session (e.g., session 208). Network terminal 202 is connected to servers 210, 212 and 214 (and services 230–238) via an interconnection network such as a local area network or other interconnection technology. The user can also start new services or terminate existing services. For example, if a login service/session (e.g., a service that prompts a user for a login) has been running for a certain period of time without a user entering the username and password (e.g., it is annotated as idle for a certain period of time), the login service may be terminated. Once a user desires to enter a username and password (e.g., by depressing a key on the keyboard), a new login session may be initiated and annotated as not idle.

The user can detach from the system by removing the card from card reader 216. Other mechanisms to express a disconnect can also be used with the invention (e.g., a "sign-off" button on network terminal 202). Services 230–238 can continue to run even after the user removes the card from card reader 216. That is, a user's associated session(s) and the services that comprise a session can continue in existence during the period that a user is unattached (e.g., logged off) from the system. When the user removes the card from card reader 216, network terminal 202 notifies authentication manager 204 (e.g., via a disconnect message) which notifies session manager 206 (e.g., via a disconnect message). Session manager 206 notifies services 230–238 (e.g., via a disconnect message) which terminate their transmission of display commands to network terminal 202. Services 230–238 continue execution, however, during the time that the user is not logged onto a network terminal. The user can log back in using a network terminal such as network terminal 202, connect to session 208 and interact with services 230–238.

While FIG. 2 depicts a single instance of each, it should be apparent that there can be multiple instances of network terminal 202, authentication manager 204, authentication modules 240, and session 208. For example, there can be more than one instance of authentication manager 204 servicing network terminal 202 or multiple instances of network terminal 202. Authentication manager 204 instances can be organized in a hierarchy according to the topology of the network or they can be globally available, for example.

Having more than one instance of the authentication manager improves the scalability of the system since it is possible to add (or remove) instances of authentication manager 204 based on the current load (e.g., the number of users). Further, reliability is improved since redundant instances of authentication manager 204 can be deployed.

Similarly, there can be a multiplicity of session manager 206 instances. Like authentication manager 204, multiple instances of session manager 206 can increase the scalability and reliability of the system.

Session Manager

Session manager 206 maintains session database 220 that contains mappings between users, sessions, and services. Session manager 206 manages the services that comprise each session managed by session manager 206. For example, session manager 206 maintains session 208 and services 230–238 within session 208.

To access a computational service provider, an account is first set up or enabled for a user. For example, to enable a user according to one embodiment of the invention, the user is given a userID, a PIN and a smart card that stores the userID and secret code. In addition, a session is created for the user. As described below, a session can have none or more required services. It may be necessary to initiate some of the required services when the session is created. Once a service is initiated, it continues to be active regardless of whether the user is connected to the system. The balance of required services can be initiated when the user first logs in.

A user is not limited to one session. There can be multiple sessions associated with a user at any given time. Session database 220 contains records that identify the session(s) and service(s) within a session that are associated with a user. An enabled user can be removed from the system (e.g., when an authentication module 240 determines that a user is no longer authentic (e.g., time limit has expired)). When a user is removed from the system, all of the user's associated sessions are removed from the system and from session database 220. Services associated with the user's sessions are stopped as well.

Once a user is enabled to use a system, the user can log onto the system via network terminal 202. When session manager 206 is notified by authentication manager 204 that the user is connected to network terminal 202, session manager 206 notifies the user's session (i.e., the services that comprise a session). Session manager 206 consults session database 220 to identify and notify the session's services. For example, session database 220 includes information that identifies session 208 and services 230–238 that are included in session 208.

In one or more embodiments, session database 220 may include currently active sessions and associated tokens. Consequently, if authentication manager 204 dies or is explicitly shut down, all sessions may be disconnected. However, once authentication manager 204 is started back up, session database 220 may be utilized to reconstruct connections between sessions and the associated tokens. In one or more embodiments, an additional database may be utilized that contains a mapping between a user identity, tokens, sessions, and associated permissions. Such a database provides information regarding whether a token is allowed access or not to a particular session and what type of session or particular services may be utilized by a particular token. Thus, varying tokens may have different levels of access associated with the token. For example, one token may provide the ability to use an internet browser application, while another token may provide unlimited access to all resources on the network, and another token may provide access to a certain desktop organization or architecture.

In one or more embodiments, a different database type may exist for each authentication module 240. Alternatively, one module 240 may utilize several database types. Such databases may be in a format consisting of key-value pairs, a table, or tabular.

In one or more embodiments, session database 220 contains permanent session records and dynamic session records that identify sessions and the services associated with a session. Session database 220 can be one or more databases or data stores. For example, permanent session records can be stored in a configuration file while dynamic session records can be stored in memory in a database system. A permanent session record contains configuration information for a user and is typically created for a user at the time the user is enabled to use the system, for example. A dynamic session record identifies those services that are associated with a user. Dynamic session records identify the required services that are associated with a user session in a permanent session record as well as currently active services. The following contains a format for a permanent session record according to an embodiment of the invention:

sessionID serviceID serviceHost servicePort isLazy

The sessionID field uniquely identifies the session that contains the required service(s). The serviceID field uniquely identifies a service associated with the session identified by sessionID. The serviceHost and servicePort fields identify the server on which a service is running and the port on the server by which a service can receive communications. The isLazy field identifies the manner in which a service is initiated. For example, isLazy can specify that the service is to be started immediately upon the creation of a session, or that the service is to be started when the user first accesses the system. There may be multiple occurrences of the serviceID, serviceHost, servicePort and isLazy fields each occurrence identifying a required service associated with the session identified by sessionID.

The dynamic session record identifies the required services for the session and those services that are currently executing in the session. A session's required services are retrieved from the permanent session record, for example. A dynamic session record can identify zero or more services (required or otherwise) that are currently executing on behalf of a user.

The fields that are used to store information about a service in a dynamic session record depends on whether the service is a required service or a service. A required service that is currently active is also a current service. The format of a dynamic session record that identifies a session's required services is the same as the permanent session record format. The following identifies the format for a record associated with a currently executing service according to an embodiment of the invention:

sessionLink TCPSocketfd requiredServiceLink serviceID

The sessionLink field identifies the service's session. An open connection, or pipe, is established between session manager 206 and a currently executing service in a session., The open connection can be used to notify either session manager 206 or the service that the other has abnormally, or otherwise, terminated. In one embodiment of the invention, the open connection is a TCP socket connection which is identified by the TCPSocketfd field. However, it should be apparent that any form of reliable connection technology that could provide a notification that a connection is disabled or disappears could be used with embodiments of the invention.

The service has an identifier that is stored in the serviceID field. A currently running service can be linked to a required service. A link to a required service is identified by the requiredServiceLink. If there is no link to a required service, the requiredServiceLink is null.

The dynamic session record can also be used to store information about a connection to a network terminal (e.g., network terminal 202). The following contains the fields that identify the connection according to an embodiment of the invention:

sessionLink Status IPAddress

Multiple sessions can be associated with a user. The sessionLink field identifies the session to which the user attached to network terminal 202 is currently linked. The sessionLink can have as its value the sessionID value, for example. The status field identifies the connection status (i.e., connected or disconnected) of network terminal 202 to the session. The IPAddress field contains the interconnection network address of network terminal 202. An IP address is used in one or more embodiments of the invention. However, it should be apparent that alternative interconnection technologies may use alternate addressing schemes. For example, an asynchronous transfer mode (ATM) network might use a thirteen digit switch prefix/end point identifier.

This information can be used by session manager 206 to send a status message to network terminal 202. If network terminal 202 does not respond within a certain period of time, session manager 206 assumes that network terminal 202 is no longer in use by the user and sends a disconnect message to each of the services in the session.

Other information of which session manager 206 is aware include a list of the open connections (e.g., services having an open TCPsocketfd) to services and a mapping between open connections and sessions and the services within a session. This information can be compiled from the session records, for example.

The information available to session manager 206 can be used to locate a session. For example, given a service, it is possible to find a session that contains the service and/or the services that are contained within a session. Further, it is possible to locate a session that is associated with a given user or instance of network terminal 202 whether or not it is currently executing, for example.

Service Initiation

When session manager 206 receives a message from authentication manager 204 that a user is connected to network terminal 202 (and has been authenticated by an authentication module 240), session manager 206 initiates those required services that are not currently active. Session manager 206 further notifies the currently active services to direct input/output (I/O) to network terminal 202. I/O can be expressed using a command protocol used to communicate with network terminal 202 and its peripheral devices.

To initiate a service, session manager 206 accesses the server on which the service is to execute to start the service. For example, session manager 206 sends a request to a well-known port on the server and passes the sessionHost, sessionPort and sessionID for session manager 206. The server connects to network terminal 202 that is attached to the service and uses the server's native authentication and permissions to allow the user to access the server. For example, in a UNIX operating environment, a UNIX service could start with a "CDE Login" screen displayed at network terminal 202 to authenticate the user and ensure that the user wishes to connect to the service.

For session manager 206 to start a service on a server, it is given the privileges needed to start the service. It may be undesirable to give session manager 206 these privileges. Further, in current networking environments, servers may be running different operating environments. In this case, session manager 206 must be aware of each operating environment's procedures for initiating a service.

Alternatively, a session-aware application running on the server can perform the initiation and register the service with session manager 206. In this case, it is not necessary for session manager 206 to have the needed privileges. Further, session manger 206 does not have to implement a centralized model for initiating services on multiple operating environments. The responsibility for initiating services is left to the session-aware applications that are running in the different operating environments. A session-aware server application has knowledge of session manager 206 (e.g., has the sessionID, sessionHost and sessionPort of session manager 206) and its interfaces (e.g., message formats).

The session-aware server application can initiate a service in response to a request received from session manager 206. Session manager 206 sends an initiate message to the server application that possesses the permission to start services in the server's operating environment. The server application initiates the service for session manager 206 and responds to session manager 206 with a valid sessionID. On the UNIX and NT systems, for example, the sessionID can be made available in the operating environment. Services such as video windows might start in this manner, for example.

Alternatively, the session-aware application can contact a service to obtain its permission in the form of a cryptographically signed authorization. The server application can transmit the sessionID and the signed authorization to session manager 206. If the session-aware application contacts session manger 206 without an authorization but with a description of the service, session manager 206 could request approval from network terminal 202 to ensure that the user authorized the service. If the user responds affirmatively, the service is added to the session. In one or more embodiments of the invention, authentication modules 240 are responsible for controlling access to one or more sessions. Consequently, an authentication module 240 may authenticate a user for a particular session or multiple sessions depending on the privileges specified in the authentication module 240.

Session Manager Messages

Session manager 206 receives and generates messages to manage the services within a session. Techniques other than those described herein can be used for initiating services. If session manager 206 initiates a service, it sends an initiate message to the server (or session-aware server application). Session manager 206 can generate an initiate message to start required services identified in session database 220, for example. As another example, session manager 206 can send an initiate message to re-activate a required service that it has determined (e.g., via an open TCP connection between session manager 206 and the service) has terminated.

Session manager 206 receives a connect message when a user of network terminal 202 successfully attaches to the system. In response to the connect message, session manager 206 verifies that all of the required services are started, and starts those that are not running. Session manager 206 sends a message (e.g., a connect message) to the services in the session to direct I/O to network terminal 206.

In one or more embodiments, session manager 206 monitors the status of sessions and can determine when there are no longer any active sessions. For example, if an embodiment utilizes two authentication modules (as described above), session manager 206 detects when the registration application/session is finished since no sessions are active. Session manager 206 transmits a message to authentication manager 204 indicating that the number of sessions are empty. Authentication manager 204 determines whether to terminate the connection with the terminal. A determination to terminate the connection causes terminal 202 to reevaluate the state of the tokens that have been presented to terminal 202. Terminal 202 may then resubmit any currently presented tokens to authentication manager 204 to start the process over again.

In one or more embodiments, when a disconnect message is received, session manager 206 sends a disconnect message to each one of the services in the session directing them to terminate sending I/O to network terminal 202.

Session manager 206 can send status messages to network terminal 206 periodically to ensure that network terminal 202 is still connected. For example, session manager 206 can examine session database 220's dynamic session records to identify each session that is currently connected to a network terminal. That is, session manager 206 can examine the status field associated with a network terminal in a dynamic session record in session database 220. Session manager 206 sends a status request (e.g., a "ping") to each network terminal that is connected with a session. If an answer is not received from network terminal 202 within a certain period of time (e.g., 20 seconds) for a particular session, session manager 206 assumes that the session is disabled and it sends a disconnect message to each service in the session instructing them to terminate display functions. In one or more embodiments, a UDP protocol is utilized to transmit a status request and receive a response.

Network terminal 202 responds to the status (e.g., ping) request from session manager 206 with either a "Card In" or "Card Out" status. If a "Card Out" status is received from network terminal 202, session manager 206 sends a disconnect message to each of the session's services.

If the "Card In" status is sent in response to a status request, network terminal 202 also indicates the number of insertions of the card in card reader 216, the number of seconds since a card insertion, and the cardID. The cardID is, for example, the value of sessionID for the user's session. Session manager 206 retains at least the last status information received from network terminal 202 to compare the new status information against the previous status information. If, for example, the number of insertions or the number of seconds for insertion differs from the last status information, session manager 206 considers the session to be disabled. In this case, session manager 206 sends a disconnect message to the session's services.

In one or more embodiments of the invention, session manager 206 does not ping terminals. In such an embodiment, a TCP/IP protocol may be utilized (a protocol that is more reliable than UDP) to transmit messages between terminal 202 and session manager 206. Due to the reliability of the TCP/IP protocol (transmission control protocol/internet protocol), a message sent from either terminal 202 or session manager 206 only needs to be sent once. As long as the connection between the terminal 202 and session manager 206 remains active, the presence or absence of a token (e.g., when a card is removed or a user logs out) may cause a "Token Inserted" message (similar to a "Card In" message) or "Token Remove" message (similar to a "Card Out" message) to be transmitted from terminal 202 to session manager 206. Once such a message is transmitted to session manager 206, session manager 206 may transmit a disconnect message to the session's services.

In one or more embodiments of the invention, authentication modules 240 may remain active and monitor the authentication state of a user or terminal. For example, when a card is removed, a smart card authentication module may remove or revoke access to sessions associated with the card. Further, as described above, authentication modules may periodically reauthenticate a user/terminal (e.g., by requesting a user name and password again, by requesting a fingerprint again, etc.).

When a service is started by, for example, a session-aware server application, a service connect message is sent to session manager 206. If the service has the proper authorization, session manager 206 adds the service to the list of services for the session and sends a message to the service to direct I/O to network terminal 202.

Authentication Manager

The authentication manager and authentication modules are responsible for ensuring the legitimacy of a user and associating/controlling access to a session(s) for a user. During the initialization process (which is described in more detail below), a port to communicate with a terminal is established and an authentication exchange takes place to authenticate the user in one embodiment of the invention. Authentication can include any mechanism that verifies the identify of the user to the system. For example, a key password can be entered or biometrics data can be collected to authenticate the user.

Authentication database 218 contains user and session information that can be accessed by authentication manager 204 or authentication modules 240. In one embodiment of the invention, the format of a record contained in authentication database 218 is as follows:

userID secret PIN sessionHost sessionPort sessionID

The userID and secret fields contain the same values as those stored in a user's smart card. The userID and secret values are typically established when the user is enabled to use the system, for example. In one embodiment of the invention, the secret field contains a 128-bit value. The PIN field is the personal identification number (PIN) that is known to the user and requested by an authentication module 240 during authentication. The userID, secret and PIN values are used to authenticate a user. Authentication database 218 could contain other information such as a password or biometrics data, if they were used to authenticate a user. Alternatively, authentication modules 240 may store the information instead of authentication database 218.

The sessionHost field identifies the computational service provider (e.g., a server) that is executing session manager 206 that is managing the user's current session. The sessionPort field identifies the port (as established by an authentication module 240) for communicating with session manager 206. The sessionID field contains a unique identifier for session manager 206. If authentication is successful, the sessionHost, sessionPort and sessionID fields are used to notify session manager 206 of the user's location at the network terminal 202. Further, authentication modules 240 are responsible for establishing and setting the port in authentication database 218.

Figure 6:
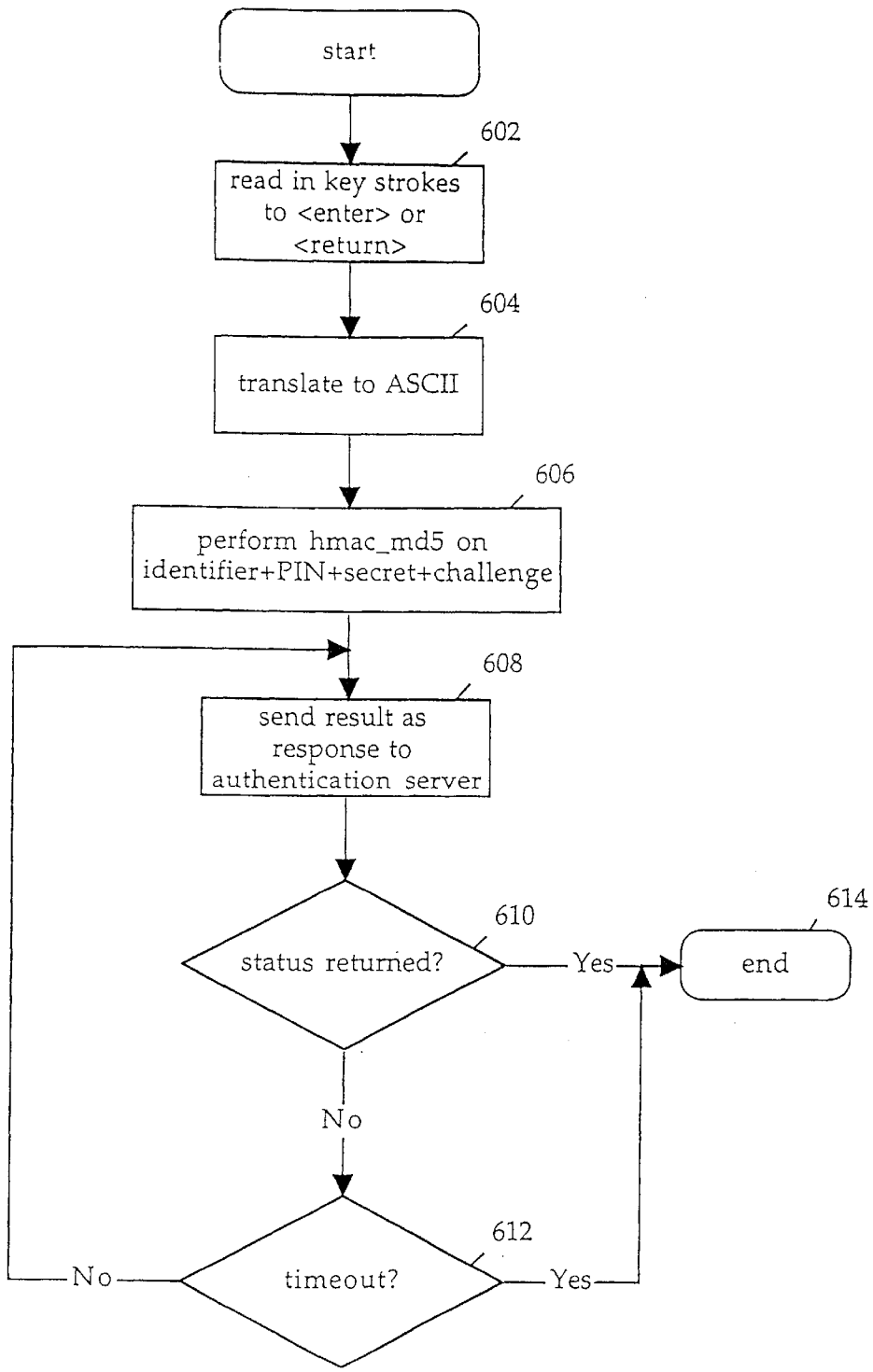
FIG. 6 provides a challenge process flow according to an embodiment of the invention.

In an embodiment of the invention, a challenge mechanism may be used to authenticate a user. (FIG. 6 provides a challenge process flow according to an embodiment of the invention.) Authentication module 240 sends a challenge to network terminal 202 to verify the authenticity of the user. Network terminal 202 prepares the challenge response, and returns it to authentication module 240. If the response to the challenge is as expected, the user is verified to authentication module 240. Authentication module 240 communicates with authentication manager 204 that communicates with session manager 206.

Figure 5A:
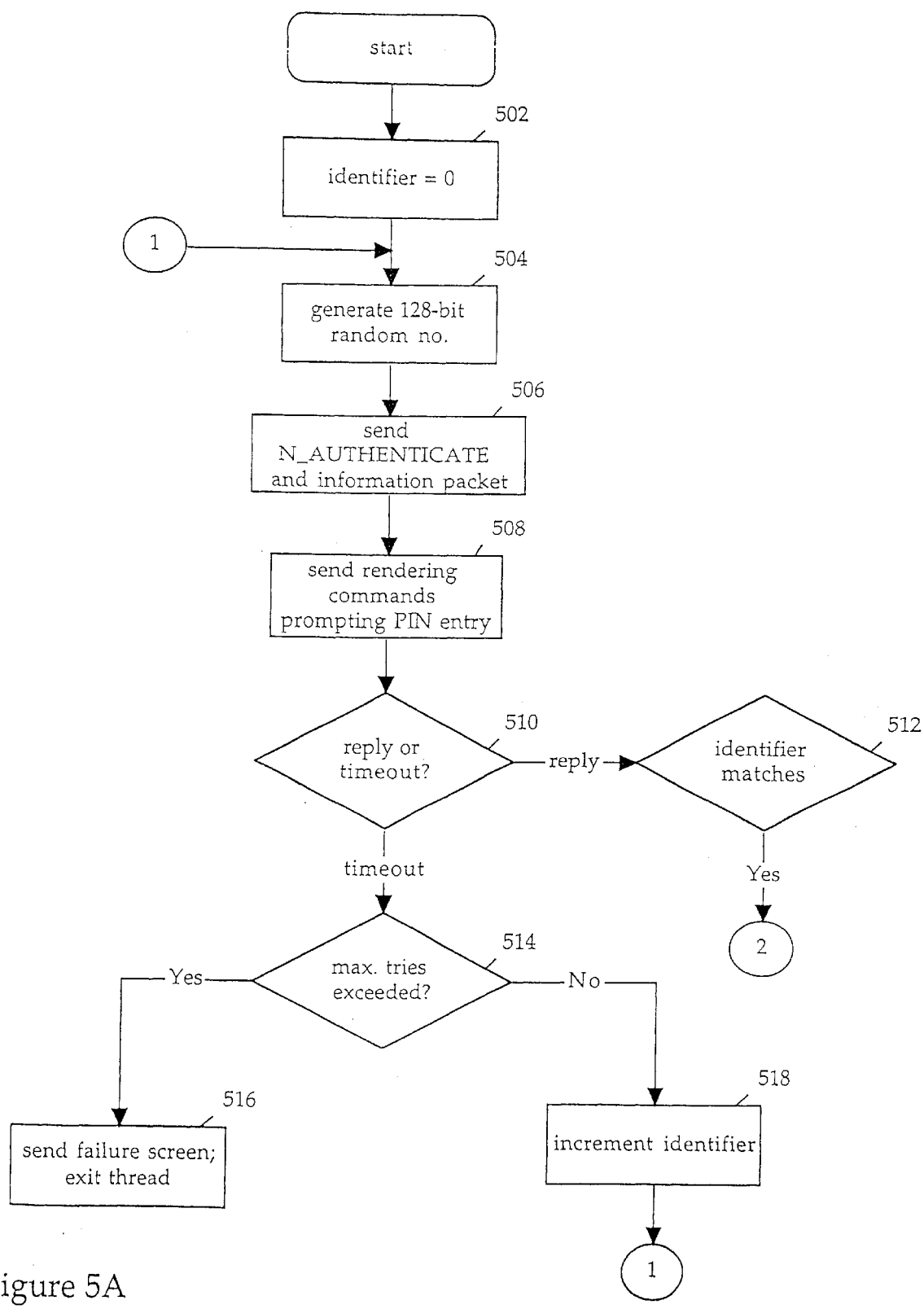
FIGS. 5A–5B provide an authentication process flow according to an embodiment of the invention.

FIGS. 5A–AB provide an authentication process flow according to an embodiment of the invention. The authentication process can be repeated more than once until authentication is successful or the number of repetitions, or rounds, exceeds a certain number. At step 502, an identifier that represents the number of the authentication round is initialized to zero. At step 504, a random number is generated that is used as the challenge number. At step 506, authentication module 240 sends an N_AUTHENTICATE command to network terminal 202 as well as a packet of information for the authentication process.

In one embodiment of the invention, the following information is sent in conjunction with the N_AUTHENTICATE command:

code identifier length valueSize value

The code field identifies the type of information contained in the information packet. For example, a value of "1" indicates that the information packet contains a challenge. The identifier field contains the value (i.e., the round indicator) that was generated at step 502. The length field identifies the length of the information packet. The value field contains the random number, or value of the challenge, generated in step 504. The valueSize identifies the size of the value field (e.g., 128 bits).

In one or more embodiments, authentication messages are transmitted as key-value pairs in an ASCII string format with each key-value pair separated by spaces and a carriage return signifying that there are no more key-value pairs. A key-value pair may be transmitted as a key (field name) followed by the equals sign ("=") followed by the value for that key (or field). For example, a key-value pair indicating a pseudo token may be "TYPE=pseudo" wherein the key is "TYPE" and the value for the key is "pseudo". Alternatively, the value may be javacard for a javacard token or mondex for a mondex card token. Such key-value pairs may be followed by a token identifier such as "ID= TOKENID343234234" wherein the key is "ID" and the value for the key is "TOKENID343234234". In one embodiment, if a space, equals sign ("="), or a new line character needs to be transmitted, it is preceded by a backslash ("\") followed by three base-8 digits that represents the character is ASCII.

At step 508, authentication module 240 sends rendering commands to network terminal 202 prompting the user for the user's PIN. At step 510, authentication module 240 waits for a response from network terminal 202 or a timeout.

If a timeout is detected at step 510, processing continues at step 514 to determine whether the maximum number of rounds has been exceeded. If not, processing continues at step 518 to increment the identifier and processing continues at step 504 to begin a new authentication round. If it is determined, at step 514, that the maximum number of rounds has occurred, processing continues at step 516 wherein authentication module 240 sends rendering commands to network terminal 202 indicating a failure and the authentication process ends. Rendering commands can be, for example, part of a command protocol used to communicate with network terminal 202 and its peripheral devices.

A challenge routine includes commands sent by authentication module 240 to network terminal 202 to capture the PIN entry by the user and generates a response. Network terminal 202 generates a response value that is the output of a hash function (i.e., a hash value or challenge response) from an input including the user's PIN, the value of the identifier, the value of the secret stored in the user's smart card and the value of the challenge (e.g., the random number generated in step 504).

A hash function can take variable-length input and convert it to a fixed-length output (a hash value). One example of a hash function takes the input and returns a byte consisting of the exclusive-or (XOR) of all the input bytes. There are many other examples of hash functions that can used with embodiments of the invention. The hmac_md5 function (RFC2104) is one example of a hashing function that is used in an embodiment of the invention to generate a response.

The following packet format is used by network terminal 202 to send the response to authentication module 240 according to one embodiment of the invention:

code identifier length valueSize value userID

The code field is set to a value of "2" which indicates that the information packet contains a challenge response. The value field contains the challenge response (e.g., the result of a hashing function). The userID field contains the user's userID.

If authentication module 240 determines (at step 510) that it received a response from network terminal 202, processing continues at step 512 to determine whether the identifier returned by network terminal 202 matches the identifier generated by authentication module 240. If so, processing continues at step 520 to examine the response returned by network terminal 202.

At step 520, authentication module 240 determines whether the challenge response matches the response expected by authentication module 240. For example, authentication module 240 can generate a hash value using its identifier, PIN, secret and challenge values. If the hash value generated by authentication module 240 matches the challenge response generated by network terminal 202, authentication is partially successful. Authentication module 240 also verifies that the interconnection network address of network terminal 202 and the user's userID are valid. If the challenge response, interconnection network address and userID are verified, authentication is successful. If not, authentication failed.

If authentication is successful, processing continues at step 528 to send an N_AUTHENTICATE command. The format of the command, according to an embodiment of the invention, is as follows:

code identifier length

The code field contains a value of "3" to indicate that the user was successfully authenticated. Processing continues at step 530 to send rendering commands to network terminal 202 indicating that session manager 206 is connecting the user to one of the user's sessions. At step 532, authentication manager 204 notifies session manager 206 that the user is connected to the system via network terminal 202 and has been authenticated for certain specified sessions. Authentication manager 204 sends the interconnection network address of network terminal 202 and session manager 206's sessionID to the server that is executing session manager 206 (i.e., the server identified in the sessionHost field of the user's authentication database record) at step 532.

If authentication failed, processing continues at step 522 to send an N_AUTHENTICATE command. Like a successful authentication, the N_AUTHENTICATE command includes a code field that indicates the status of the authentication process. A code value of "4" is used, for example to indicate that authentication failed. Processing continues at step 524 to send rendering commands to network terminal 202 indicating that the authentication failed and instructing the user to remove the smart card from card reader 216.

The authentication process ends at step 526.

Figure 5B:
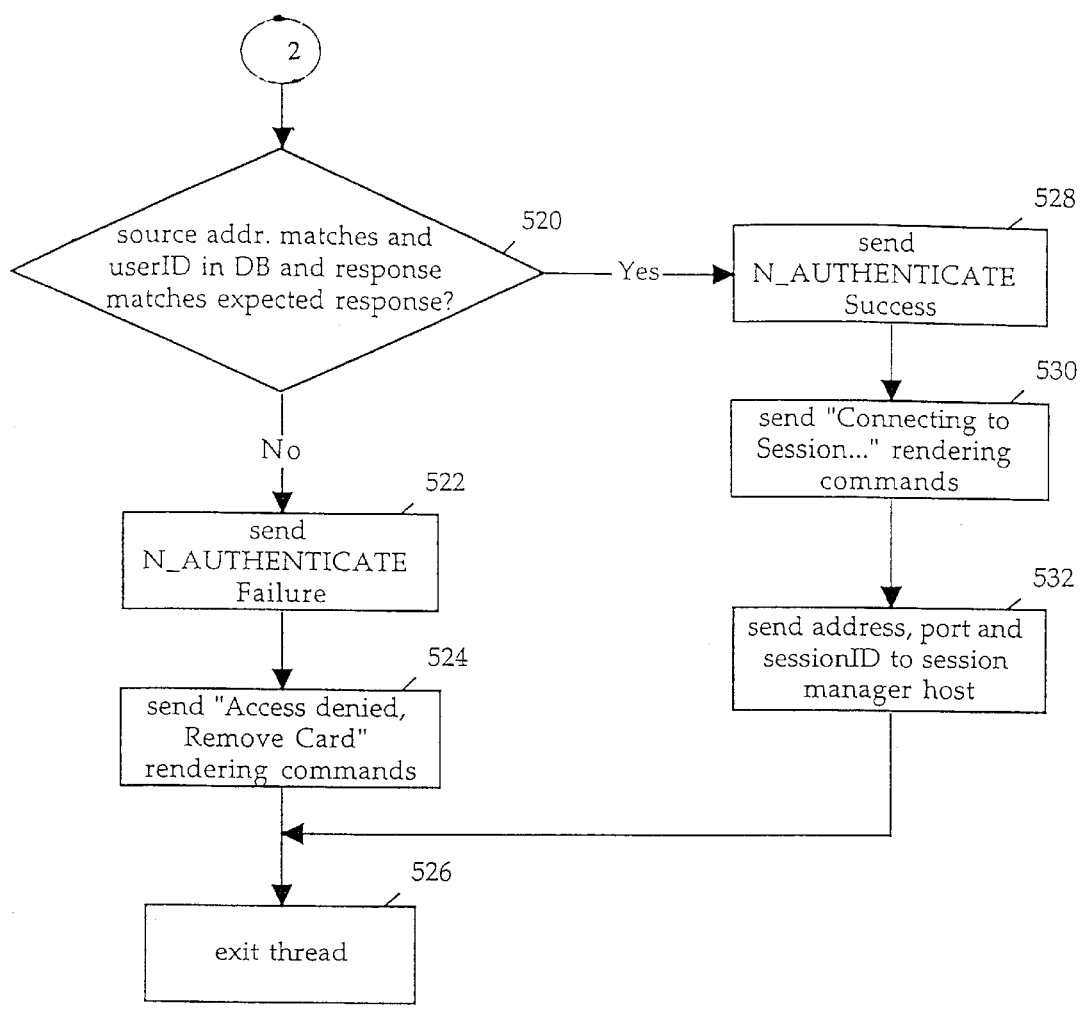

The process described with reference to FIGS. 5A–5B is one example of an authentication process. It should be apparent that other authentication techniques can be used with embodiments of the invention. In an alternate embodiment the user is not requested to enter a PIN. The user's card in card reader 216 is enough to authenticate the user. The userID and secret value can be hashed with the identifier and the challenge received from authentication module 240 to generate a response to a challenge by authentication module 240. In this way, a user can attach to the user's services simply by inserting a card containing valid information into card reader 202.

Further, it should be apparent that embodiments of the invention can be used wherein no authentication of a user is performed. For example, in a trusted or secure environment there may be no need to verify the authenticity of a user. In one or more embodiments of the invention, a user is connected to a session only after being authenticated by authentication manager 204 or authentication modules 240. In such an embodiment, an authentication module 240 may authenticate all users merely when presented with a token or when any name is typed into a login session, for example. Thus, the user only needs to provide an identification (e.g., userID) or the terminal only needs to present a token. Consequently, if the user provides a valid userid (which may be designated as any id or any token), the user is given access to the session that is associated with the userID (or token). Such tokens may be utilized to keep track of session to token mappings so that if a user switches terminals, the appropriate session to transmit to the terminal may be determined merely by checking the mapping.

When the user disconnects from network terminal 202, authentication manager 204 or authentication modules 240 is informed and informs session manager 206 of the disconnection. For example, when the user removes the smart card from card reader 216, card reader 216 informs network terminal 202. Network terminal 202 informs authentication manager 204 or authentication module 240 of the disconnection. Authentication manager 204 (which may have been informed by authentication module 240) informs session manager 206 that the user has disconnected from network terminal 202. Session manager 206 notifies each of the services in the user's session.

Challenge Routine

The authentication process can include a challenge initiated by authentication module 240. FIG. 6 provides a challenge routine process flow for handling a challenge according to an embodiment of the invention. The challenge routine executes on network terminal 202 in response to a challenge command received from authentication module 240.

At step 602, the key entry received from the user is read until a return or enter key is pressed. The key entry is translated to ASCII characters at step 604. At step 606, a hash function is used to generate a hash value, or challenge response, from the concatenation of the identifier, PIN, secret, and challenge values. The challenge response is sent to authentication module 240 at step 608. At step 610, network terminal 202 awaits a response from authentication module 240 or a timeout. If a response or a timeout occurs, the challenge routine ends at step 614.

Network Terminal Initialization

Network terminal 202 performs some initialization when it is first turned on. While a user is not using network terminal 202, network terminal 202 can be in a dormant state if it is powered on. A user can awaken network terminal 202 from its dormant state using one of the techniques described herein, for example. It should be apparent that other techniques can be used to awaken network terminal.

Figure 3:
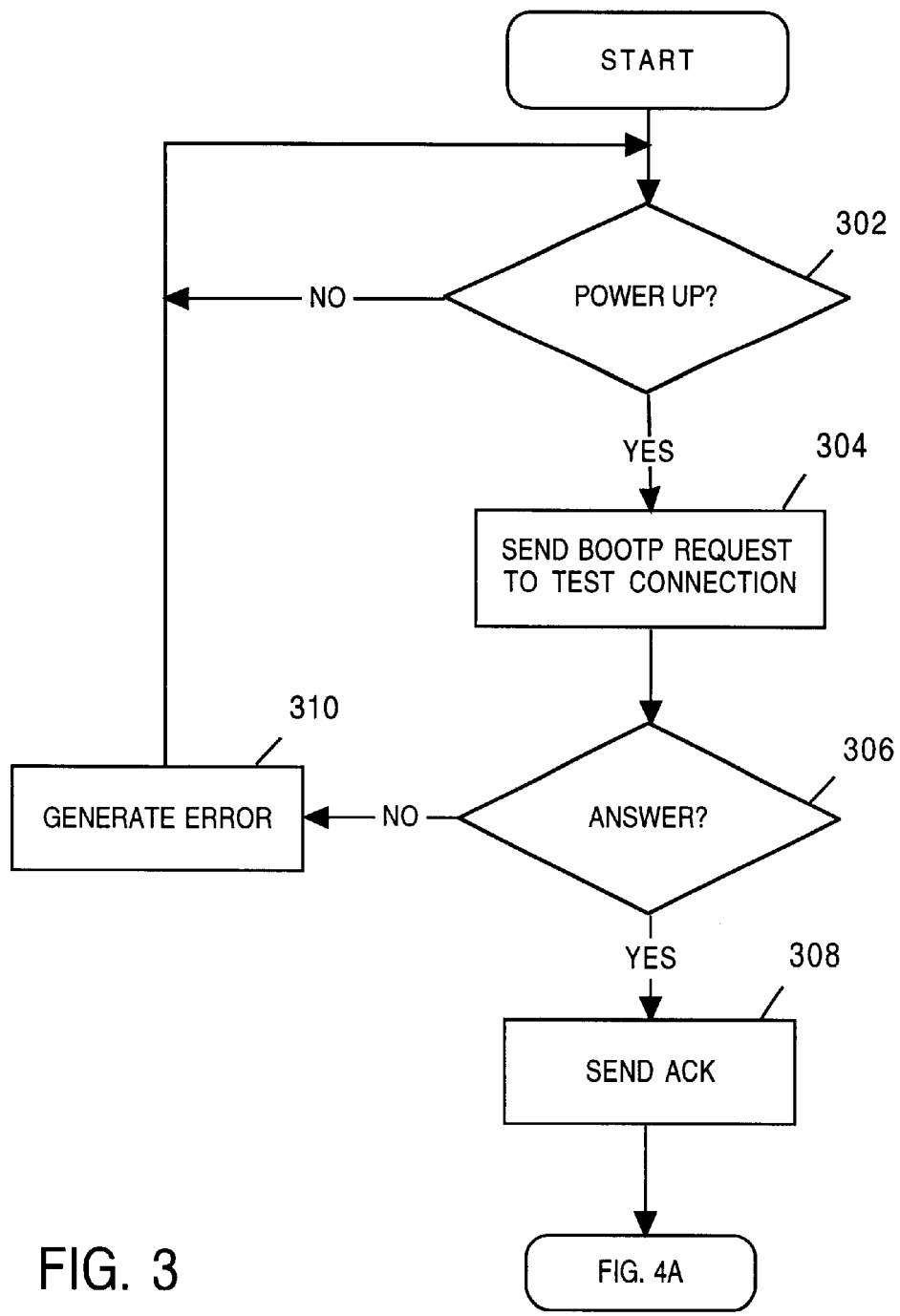
FIG. 3 provides a process flow for initializing a network terminal in response to a power up operation according to an embodiment of the invention.

FIG. 3 provides a process flow for initializing network terminal 202 in response to a power up operation according to an embodiment of the invention. At step 302, a determination is made whether a power up operation has occurred. If not, processing continues to wait for a power up operation. At step 304, a request is generated by network terminal 202 to the network to test the network connection. At step 306, a determination is made whether a response is received. If not, processing continues at step 310 to generate an error and processing continues at step 302 to await a power up operation.

Figure 4A:
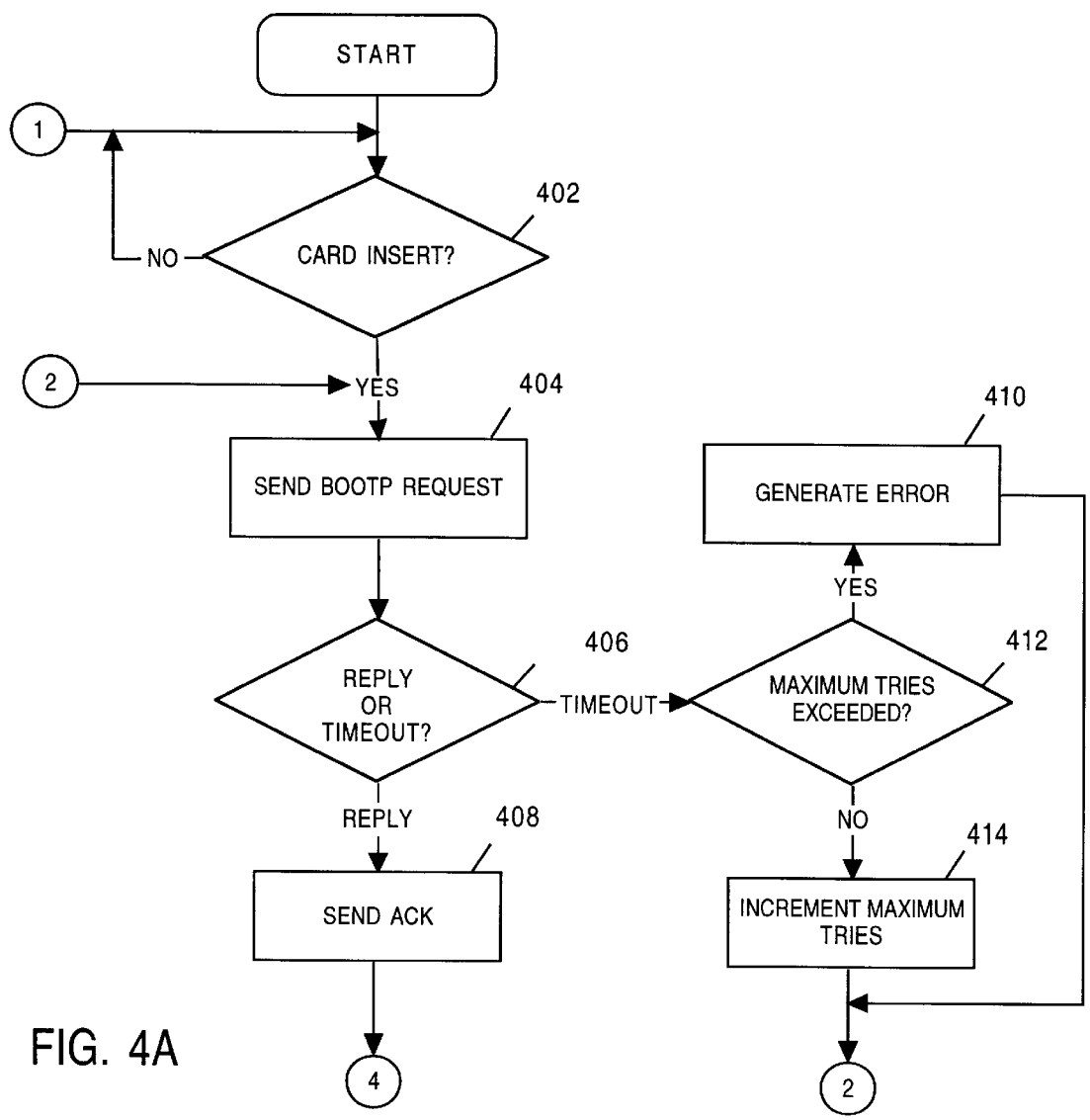
FIGS. 4A–4C provide a process flow according to an embodiment of the invention for initializing network terminal 202 in response to an awaken operation.

If it is determined, at step 306, that an answer is received, processing continues at step 308 to send an acknowledge (an ACK) message and initialization of network terminal 202 can continue at step 402 of FIG. 4A.

Figure 4B:
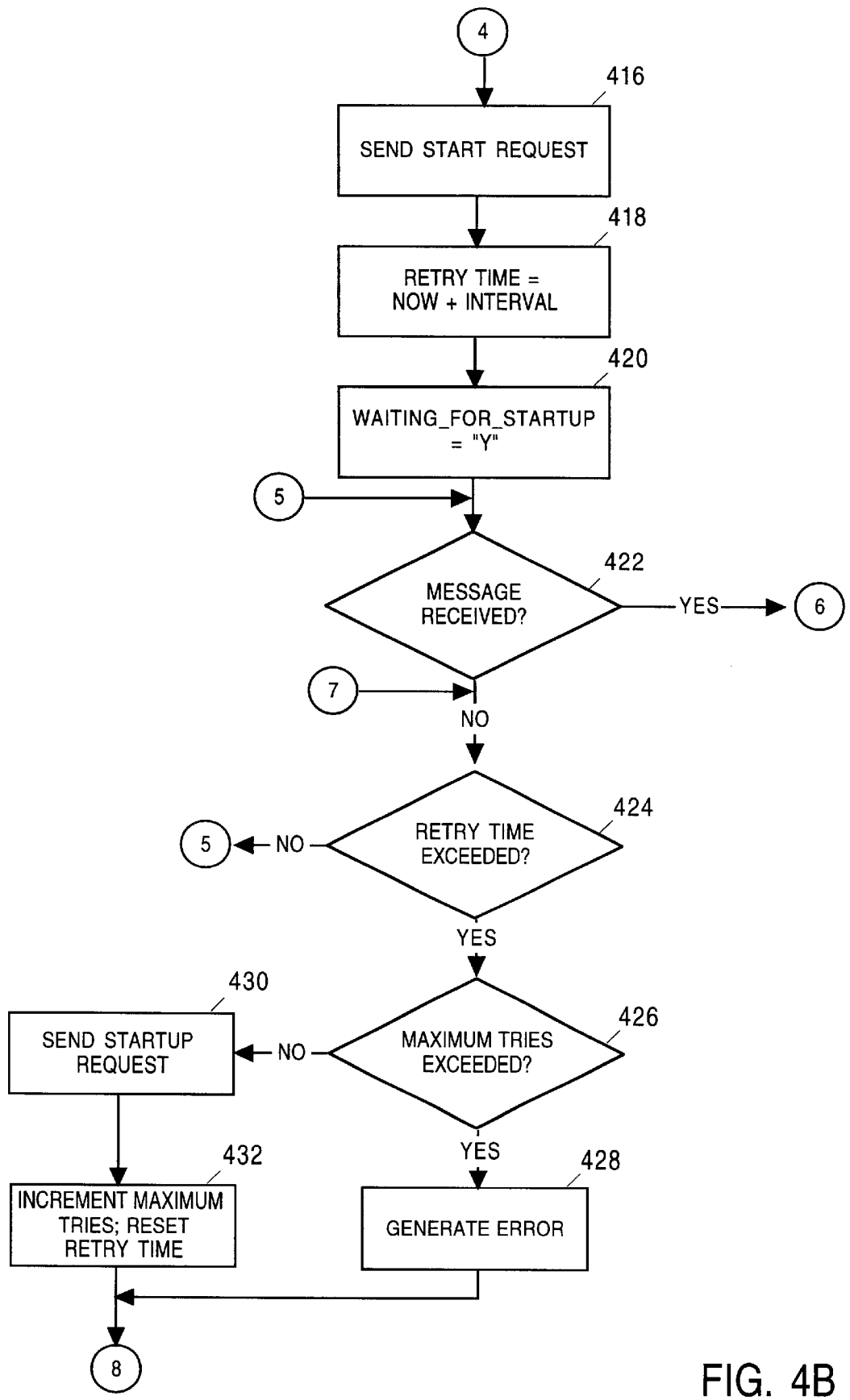
Figure 4C:
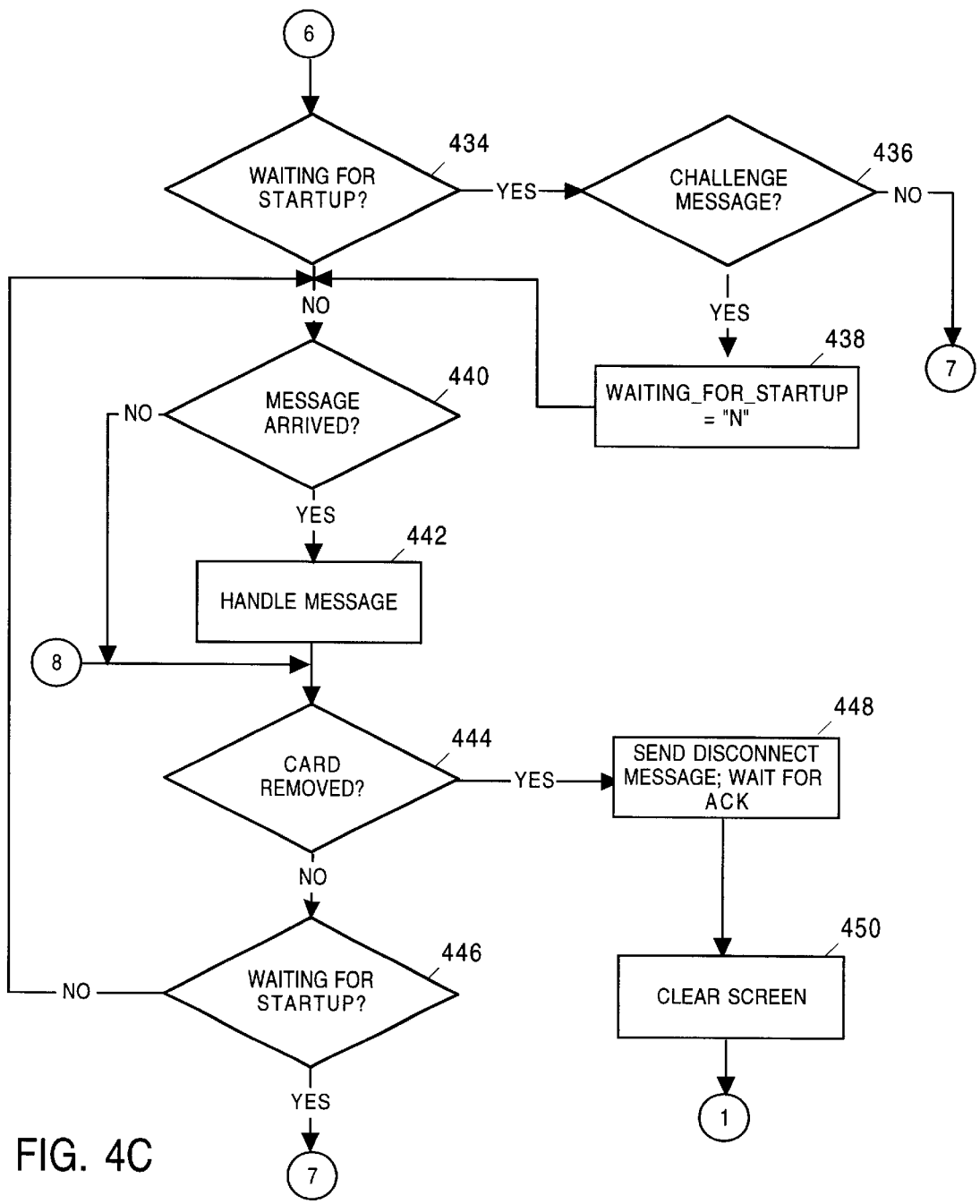

FIGS. 4A–4C provide a process flow according to an embodiment of the invention for initializing network terminal 202 in response to an awaken operation. Referring to FIG. 4A, network terminal 202 waits for notification of the awaken operation. In an embodiment of the invention, the awaken operation is the insertion of a user's smart card in card reader 216.

If it is determined that a smart card is inserted in card reader 216, processing continues at step 404 to send a request to obtain the interconnection network addresses of authentication manager 204 and network terminal 202. Alternatively, a user's smart card can be preprogrammed with the interconnection network addresses. Network terminal 202 can read the interconnection network addresses from the smart card via card reader 216, for example. In one or more embodiments, a user's home server (or preferred server) is preprogrammed into a user's smart card. Consequently, if a user is working on a remote network, the user may still connect to the user's home server with the ability to utilize services associated with that server (that may not be available or available to the user on the remote network).

At step 406, network terminal 202 awaits a response or a timeout. If a timeout occurs, processing continues at step 412 to determine whether the maximum number of tries has been exceeded. If the maximum number of tries has been exceeded, processing continues at step 410 to generate an error. If the maximum number of tries has not been exceeded, processing continues at step 414 to increment the number of tries and processing continues at step 404 to resend the request for the interconnection network addresses.

When a response to the request is received, processing continues at step 408 to send an ACK. Processing continues at step 416 of FIG. 4B. At step 416, network terminal 202 sends a startup request to authentication manager 204. At step 418, a retry time is set in which network terminal 202 waits for a response to the startup request. At step 420, a variable is set to indicate that network terminal 202 is waiting for a response to the startup request. At step 422, network terminal 202 waits for a response to the startup request. While network terminal 202 awaits a response, authentication manager 204 may present the message to one or more authentication modules 240 to determine if one or more modules desires to take responsibility for the request.

If it is determined that a response is not received, processing continues at step 424 to determine whether the retry time as been exceeded. If not, processing continues at step 422 to wait for a response. If the retry time has been exceeded, processing continues at step 426 to determine whether the maximum number of tries has been exceeded. If not, processing continues at step 428 to generate an error and return to step 416 to resend the startup request. If not, processing continues at step 430 to increment the number of tries and reset the retry time. At step 432, the startup request is resent and processing continues at step 444 to determine whether the card has been removed from card reader 216.

If it is determined, at step 422, that a response was received, processing continues at step 434 of FIG. 4C. At step 434, network terminal 202 examines the variable initially set in step 420 to determine whether it is waiting for a response to the startup request. If so, processing continues at step 436 to determine whether the response is a challenge message (e.g., by an authentication module). If not, processing continues at step 424 to repeat the startup request if the maximum number of tries has not been exceeded. If it is determined, at step 436, that a challenge message has been received, processing continues at step 438 to set the waiting_for_startup variable is set to no (i.e., "N"). Processing continues at step 440 to process the challenge request at steps 440 and 442. The challenge request can be handled as described above with reference to FIGS. 5A–5B and 6, for example.

If it is determined, at step 434, that network terminal 202 is not waiting for a response to a startup request, processing continues at steps 440 and 442 to handle the message (e.g., rendering commands to display output generated by service 234).

At step 444, a determination is made whether the user has removed the smart card from card reader 216. When the user removes the card from card reader 216, network terminal 202 sends a disconnect message to authentication manager 204 (or the appropriate authentication module 240) at step 448. Network terminal 202 waits for an acknowledgment (ACK) message from authentication manager 204 (or authentication module 240). When the ACK message is received, network terminal 202 clears the screen, at step 450, and returns to step 402 to wait for another user to insert a smart card in card reader 216.

If it is determined, at step 444, that the user has not removed the card from card reader 216, processing continues at step 446 to determine whether network terminal is waiting for a response to its startup request. If so, processing continues at step 422 to determine whether a response has been received. If network terminal is not waiting for a response from a startup request, processing continues at steps 440 and 442 to process any messages sent to network terminal 202.

Message Format

In an embodiment of the invention, a connection to network terminal 202 is established via a user datagram protocol (UDP) port. That is, packets are sent via a UDP connection and received at a destination UDP port. The destination UDP port uniquely identifies the connection. Packet length and checksum information are provided by the UDP header. Buffer size fits in an Ethernet Maximum Transfer Unit (MTU) with IP/UDP headers. Data is sent over the network in network byte order (big-endian).

It should be apparent that other protocols can be used in place of UDP. For example, protocols such as an ATM AAL5 (AAL or ATM Adaptation Layer) can be used.

Thus, a method and apparatus for session management and user authentication has been described. Particular embodiments described herein are illustrative only and should not limit the present invention thereby. The invention is defined by the claims and their full scope of equivalents.

What is claimed is:

1. A system for controlling access by a user to sessions, comprising:

an authentication manager for obtaining an authentication request from said user, wherein said authentication request comprises at least one of a token and a pseudo token;

a plurality of authentication modules for authenticating said user, wherein said plurality authentication modules are distinct from said authentication manager and wherein said plurality authentication modules are not input devices; and a session manager for obtaining notification of authentication from said plurality of authentication modules.

2. The system of claim 1, wherein said plurality of authentication modules comprise an authentication module configured to only accept a connection with said user if said user has said token.

3. The system of claim 1, wherein said plurality of authentication modules comprise an authentication module configured to only accept a connection with said user if said user has said pseudo token.

4. The system of claim 1, wherein said plurality of authentication modules comprise a first authentication module for accepting users with tokens and a second authentication module for accepting users with pseudo tokens.

5. The system of claim 1, wherein said plurality of authentication modules comprise a third authentication module for accepting all users.

6. The system of claim 1, wherein said pseudo token comprises at least one of an Ethernet address and a media access controller address.

7. The system of claim 1, wherein said authentication request comprises an ordered ASCII string and wherein said ordered ASCII string comprises a token type indication.

8. A system for controlling access by a user to sessions, comprising:
    an authentication manager for obtaining an authentication request from said user;
    first and second authentication modules for authenticating said user, wherein said first and second authentication modules are distinct from said authentication manager, wherein said first and second authentication modules are not input devices, wherein said first authentication module is configured to accept said authentication request if said authentication request is registered with the system, and wherein said second authentication module is configured to accept all authentication requests; and
    a session manager for obtaining notification of authentication from said first and second authentication modules.

9. The system of claim 8, wherein said authentication manager is configured to present said authentication request only to said first authentication module.

10. The system of claim 9, wherein said first authentication module is configured to present said authentication request to said second authentication module.

11. The system of claim 10, wherein said first authentication module is configured to present said authentication request to said second authentication module if said first authentication module does not want to accept responsibility for said authentication request.

12. The system of claim 8, wherein said authentication request is presented to said second authentication module only if said authentication request is not registered with the system.

13. The system of claim 8, wherein said second authentication module can register said authentication request with the system.

14. A system for controlling access by a user to sessions, comprising:
    an authentication manager for obtaining an authentication request from said user;
    an authentication module for authenticating said user, wherein said authentication module is distinct from said authentication manager, wherein said authentication module is not an input device, and wherein said authentication manager is configured to present said authentication request to said authentication module; and
    a session manager for obtaining notification of authentication from said authentication module, wherein said authentication manager is configured to provide said authentication module with a start session service for ensuring that a session is started.

15. The system of claim 14, wherein said authentication module comprises a plurality of cascaded authentication modules, wherein each of said plurality of cascaded authentication module is configured to accept responsibility for a particular type of authentication request, and wherein said authentication request is presented from one cascaded authentication module to another until said authentication request is presented to a cascaded authentication module that can accept responsibility for said authentication request.

16. The system of claim 15, wherein at least one of said cascaded authentication modules is configured to revoke said authentication request.

17. The system of claim 15, wherein at least one of said cascaded authentication modules is configured to request a first password from said user and a second password from said user.

18. The system of claim 15, wherein at least one of said cascaded modules is configured to accept responsibility for an authentication request based on biometric data.

19. The system of claim 15, wherein at least one of said cascaded authentication modules is configured to accept responsibility for an authentication request based on a smart card.

20. The system of claim 15, wherein at least one of said cascaded authentication modules is configured to authenticate said authentication request for a specified period of time.

21. The system of claim 14, wherein said authentication manager, said authentication module, and said session manager are configured using a computer readable program code.

* * * * *